US010722796B2

(12) United States Patent
Jiang et al.

(10) Patent No.: US 10,722,796 B2
(45) Date of Patent: Jul. 28, 2020

(54) DRESSING METHOD, DEVICE, COMPUTER READABLE MEDIUM, AND ELECTRONIC DEVICE

(71) Applicant: TENCENT TECHNOLOGY (SHENZHEN) COMPANY LTD, Shenzhen (CN)

(72) Inventors: Hao Jiang, Shenzhen (CN); Sheng Wei Lin, Shenzhen (CN); Yi Xu, Shenzhen (CN); Qi Fa Guo, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 16/438,676

(22) Filed: Jun. 12, 2019

(65) Prior Publication Data

US 2019/0291006 A1  Sep. 26, 2019

Related U.S. Application Data

(63) Continuation of application No. PCT/CN2018/080213, filed on Mar. 23, 2018.

(30) Foreign Application Priority Data

Apr. 1, 2017  (CN) .......................... 2017 1 0214239

(51) Int. Cl.
*A63F 13/52* (2014.01)
*A63F 13/55* (2014.01)
(Continued)

(52) U.S. Cl.
CPC .............. *A63F 13/52* (2014.09); *A63F 13/55* (2014.09); *G06F 8/658* (2018.02); *G06T 11/60* (2013.01);
(Continued)

(58) Field of Classification Search
CPC ...... A63F 13/52; A63F 13/55; A63F 2300/66; G06F 8/658; G06F 3/04845; G06T 11/60;
(Continued)

(56) References Cited

U.S. PATENT DOCUMENTS 10,169,897 B1 * 1/2019 Geiger .............. H04L 29/06176
10,432,559 B2 * 10/2019 Baldwin ................. G06T 13/80
(Continued)

FOREIGN PATENT DOCUMENTS

| CN | 102385759 A | 3/2012 |
|---|---|---|
| CN | 103198505 A | 7/2013 |

(Continued)

OTHER PUBLICATIONS

Wilson et al., U.S. Appl. No. 62/399,294 (of US 2018/0091732 A1), Specification, filed Sep. 2016 (Year: 2016).*

(Continued)

*Primary Examiner* — Chante E Harrison
(74) *Attorney, Agent, or Firm* — Sughrue Mion, PLLC

(57) ABSTRACT

A costume replacement method includes, based on a user input, obtaining information of a model including a plurality of parts, the plurality of parts including a target part of which a costume is to be replaced, obtaining image set object data corresponding to the model of which the information is obtained, the image set object data including a plurality of pieces of image data respectively corresponding to the plurality of parts, and obtaining costume replacement data corresponding to the target part included in the model of which the information is obtained. The method further includes updating the obtained image set object data by updating one of the plurality of pieces of image data corresponding to the target part, based on the obtained costume replacement data, and rendering the model, based (Continued)

on the updated image set object data, to update the costume of the target part included in the model.

18 Claims, 16 Drawing Sheets

(51) Int. Cl.
 *G06T 11/60* (2006.01)
 *G06F 8/658* (2018.01)
(52) U.S. Cl.
 CPC ....... *A63F 2300/66* (2013.01); *G06T 2210/16* (2013.01)
(58) Field of Classification Search
 CPC ......... G06T 2210/16; G06T 3/40; G06T 3/60; G06T 3/606; G06T 2219/2016; G06T 3/04845; G09G 2340/04
 See application file for complete search history.

(56) References Cited

U.S. PATENT DOCUMENTS

| | | | | |
|---|---|---|---|---|
| 2009/0222127 | A1* | 9/2009 | Lind | A41H 3/007 700/132 |
| 2012/0223940 | A1* | 9/2012 | Dunstan | G06T 13/80 345/419 |
| 2014/0022238 | A1* | 1/2014 | Oh | G06T 19/00 345/419 |
| 2014/0249961 | A1* | 9/2014 | Zagel | G06K 9/00369 705/26.61 |
| 2016/0035142 | A1* | 2/2016 | Nair | G06T 17/205 345/420 |
| 2016/0127710 | A1* | 5/2016 | Saban | G02B 5/08 386/241 |
| 2018/0091732 | A1* | 3/2018 | Wilson | G06F 3/048 |
| 2018/0240271 | A1* | 8/2018 | Chester | G06T 17/20 |
| 2018/0315254 | A1* | 11/2018 | Grant | G06T 19/20 |
| 2019/0206145 | A1* | 7/2019 | Li | G06T 13/40 |
| 2019/0261717 | A1* | 8/2019 | Schultz | G06Q 30/0621 |
| 2019/0347868 | A1* | 11/2019 | Scapel | G06T 13/40 |

FOREIGN PATENT DOCUMENTS

| | | |
|---|---|---|
| CN | 106075909 A | 11/2016 |
| CN | 106970800 A | 7/2017 |

OTHER PUBLICATIONS

Office Action for corresponding CN 201710214239.2, dated Feb. 27, 2018.
Office Action for corresponding CN 201710214239.2, dated Nov. 15, 2018.
International Search Report for PCT/CN2018/080213, dated Jun. 26, 2018.

* cited by examiner

DRESSING METHOD, DEVICE, COMPUTER READABLE MEDIUM, AND ELECTRONIC DEVICE

CROSS-REFERENCE TO RELATED APPLICATIONS

This application is a continuation of International Patent Application No. PCT/CN2018/080213 filed on Mar. 23, 2018, in the Chinese Patent Office, which claims priority from Chinese Patent Application No. CN201710214239.2 filed on Apr. 1, 2017, in the Chinese Patent Office, the disclosures of which are incorporated herein by reference in their entireties.

BACKGROUND

1. Field

Methods and apparatuses relate to computer technologies, and particularly, to a costume replacement method, a costume replacement apparatus, a computer readable medium, and an electronic device.

2. Description of Related Art

In a game scenario, to provide a rich role, a role model usually needs a costume replacement system that may replace a costume of the role model.

At present, a game is usually developed based on a game engine, while the game engine only provides an integral skin replacement interface. To realize local costume replacement of a role model, in related technologies, a plurality of sets of skin resources may be preset for the role model and loaded to a memory when the engine loads the role model, and parts with different skins are replaced by modifying a conventional skin replacement interface, to realize local costume replacement.

However, according to the foregoing local costume replacement manner, a quantity of sets of costumes replaced for a role is limited. When a user obtains a new local costume for a role model from a network, the user needs to download a whole set of model files (including a picture png, atlas, and a json file, usually occupying more than 100 MB), a data flow is large and a costume replacement cost is high, with a result that the role model cannot be subject to local costume replacement flexibly.

SUMMARY

According to embodiments, there is provided a costume replacement method, the costume replacement method being performed by at least one processor, and the costume replacement method including, based on a user input, obtaining information of a model including a plurality of parts, the plurality of parts including a target part of which a costume is to be replaced, obtaining image set object data corresponding to the model of which the information is obtained, the image set object data including a plurality of pieces of image data respectively corresponding to the plurality of parts, and obtaining costume replacement data corresponding to the target part included in the model of which the information is obtained. The costume replacement method further includes updating the obtained image set object data by updating one of the plurality of pieces of image data corresponding to the target part, based on the obtained costume replacement data, and rendering the model, based on the updated image set object data, to update the costume of the target part included in the model.

According to embodiments, there is provided a costume replacement method, the costume replacement method being performed by at least one processor, and the costume replacement method including, based on a user input, obtaining information of a model including a plurality of parts, the plurality of parts including a target part of which a costume is to be replaced, obtaining image set object data corresponding to the model of which the information is obtained, the image set object data including a plurality of pieces of image data respectively corresponding to the plurality of parts, and obtaining costume replacement data corresponding to the target part included in the model of which the information is obtained. The costume replacement method further includes creating new image set object data corresponding to the model, based on the obtained image set object data and the obtained costume replacement data, and rendering the model, based on the created new image set object data, to update the costume of the target part included in the model.

An electronic device includes at least one memory configured to store computer program code, and at least one processor configured to access the at least one memory and operate according to the computer program code. The computer program code includes first obtaining code configured to cause the at least one processor to, based on a user input, obtain information of a model including a plurality of parts, the plurality of parts including a target part of which a costume is to be replaced, second obtaining code configured to cause the at least one processor to obtain image set object data corresponding to the model of which the information is obtained, the image set object data including a plurality of pieces of image data respectively corresponding to the plurality of parts, and third obtaining code configured to cause the at least one processor to obtain costume replacement data corresponding to the target part included in the model of which the information is obtained. The computer program code further includes first updating code configured to cause the at least one processor to update the obtained image set object data by updating one of the plurality of pieces of image data corresponding to the target part, based on the obtained costume replacement data, and second updating code configured to cause the at least one processor to render the model, based on the updated image set object data, to update the costume of the target part included in the model.

DETAILED DESCRIPTION

Figure 1:
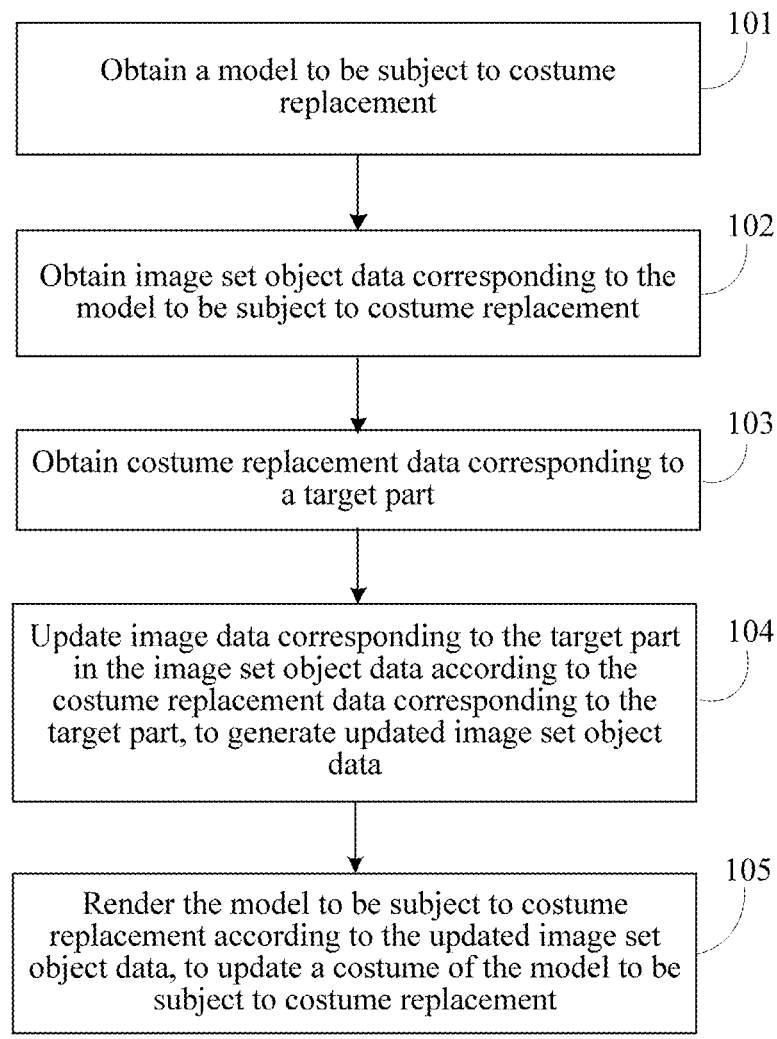
FIG. 1 is a flowchart of a costume replacement method according to embodiments.

Embodiments of this application are described in detail as follows, the examples of the embodiments are shown in the accompanying drawings, and reference numerals that are the same or similar all along represent same or similar elements or elements have the same or similar functions. The embodiments that are described with reference to the accompany drawings are examples, and are only used to interpret this application, instead limiting this application.

In the description of this application, it may be understood that, the term "a plurality of" refers two or more than two. The terms "the first" and "the second" are only descriptive, but cannot be understood to indicate or imply relative importance.

The costume replacement methods and apparatuses according to the embodiments of this application are described with reference to the accompanying drawings.

FIG. 1 is a flowchart of a costume replacement method according to embodiments. For example, the costume replacement method is applied to a terminal device. The terminal device may be a hardware device having various operating systems, such as a personal computer, a mobile phone, and a tablet computer.

As shown in FIG. 1, the costume replacement method in these embodiments includes the following steps:

Step 101: Obtain a model to be subject to costume replacement.

The model to be subject to costume replacement includes a plurality of parts.

Each part of the model to be subject to costume replacement may be subject to costume replacement and a part is the smallest unit of costume replacement.

The model to be subject to costume replacement may be a person model, for example, a person model generated by a Spine skeleton model, and the person model includes parts such as a head, a body, arms, and legs.

The skeleton model generates the person model according to pictures of each skeleton of the person model and a relationship of each skeleton in the person model.

Step 102: Obtain image set object data corresponding to the model to be subject to costume replacement.

As an example implementation, the image set object data corresponding to the model to be subject to costume replacement may be obtained according to correspondence of identifier information of the model to be subject to costume replacement, a pre-stored identifier of the model, and the image set object data.

The image set object data includes a plurality of pieces of image data respectively corresponding to the plurality of parts in the model to be subject to costume replacement, and the image set object data is a set of all image data of each part of the model to be subject to costume replacement.

The image data is image data used by a costume or an outfit of a part of the model displayed in a scenario. For example, the image set object data includes a cap image, a clothes image, a glove image, and a trousers image of a person. The image set object data stores the data, so that the data may be loaded when the role is rendered, to generate a costume corresponding to the role.

Step 103: Obtain costume replacement data corresponding to a target part.

In embodiments, the costume replacement data corresponding to the target part may be obtained in many manners. The examples of the manners are described as follows.

As an example, the costume replacement data of the target part is obtained from a local resource database.

Specifically, when a user needs to replace a costume of the model to be subject to costume replacement, the terminal device receives a costume replacement instruction of the user, and the costume replacement instruction includes an identifier of the model to be subject to costume replacement and an identifier of the target part.

Correspondingly, the terminal device queries the local resource database according to the identifier of the model to be subject to costume replacement and the identifier of the target part, to obtain the costume replacement data of the target part.

As another example, the costume replacement data of the target part is obtained from a server.

Specifically, when a user needs to replace a costume of the model to be subject to costume replacement, the terminal device receives a costume replacement instruction of the user, and the costume replacement instruction includes an identifier of the model to be subject to costume replacement and an identifier of the target part.

Correspondingly, the terminal device sends a resource obtaining request including the identifier of the model to be subject to costume replacement and the identifier of the target part to the server, so that the server obtains costume replacement data of the target part according to the identifier of the model to be subject to costume replacement and the identifier of the target part and returns the costume replacement data of the target part to the terminal device.

Correspondingly, the terminal device receives the costume replacement data of the target part sent by the server.

When the user needs to replace a costume of the model to be subject to costume replacement, the terminal device receives a costume replacement instruction of the user, and the costume replacement instruction includes the identifier of the model to be subject to costume replacement and the identifier of the target part.

When the terminal device does not find the costume replacement data corresponding to the target part in the local resource database according to the identifier of the model to be subject to costume replacement and the identifier of the target part, the terminal device sends the resource obtaining request including the identifier of the model to be subject to costume replacement and the identifier of the target part to the server, so that the server obtains costume replacement data of the target part according to the identifier of the model to be subject to costume replacement and the identifier of the target part and returns the costume replacement data of the target part to the terminal device. Correspondingly, the terminal device receives the costume replacement data of the target part sent by the server.

Step 104: Update image data corresponding to the target part in the image set object data according to the costume replacement data corresponding to the target part, to generate updated image set object data.

Figure 2A:
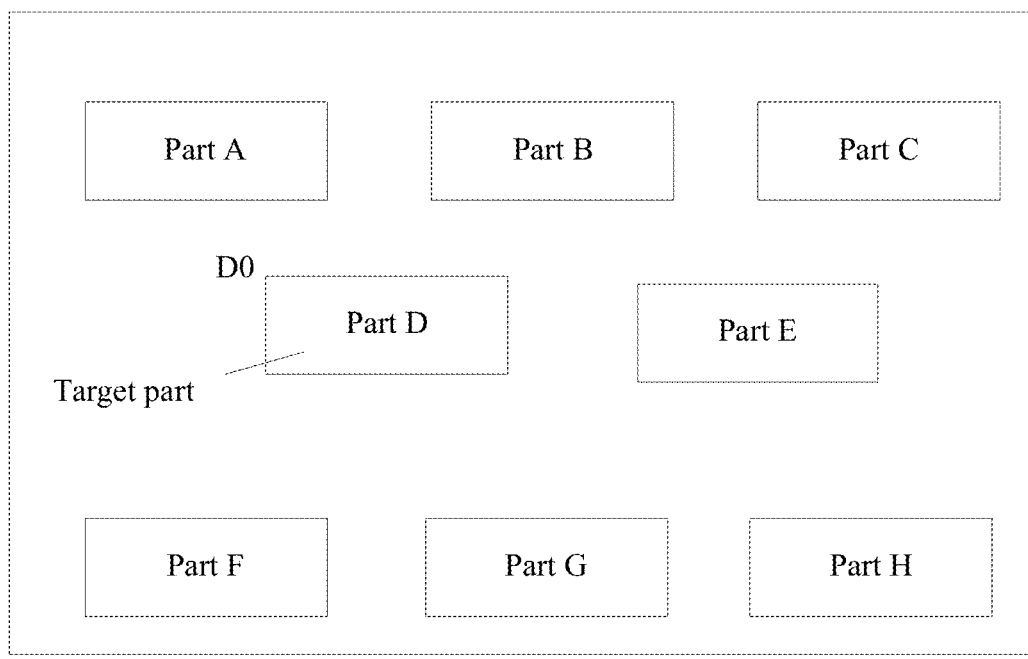
FIG. 2A is a diagram of image set object data corresponding to a model to be subject to costume replacement before costume replacement, according to embodiments.
Figure 2B:
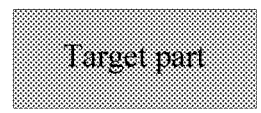
FIG. 2B is a diagram of costume replacement data corresponding to a target part D, according to embodiments.
Figure 2C:
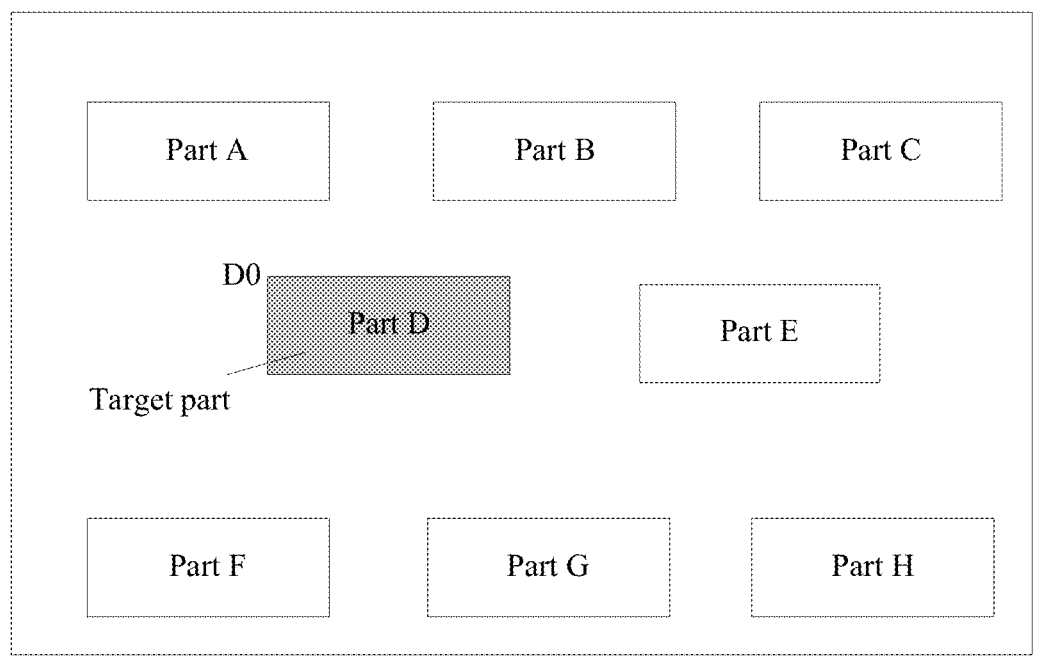
FIG. 2C is a diagram of updated image set object data according to embodiments.

FIG. 2A is a diagram of image set object data corresponding to a model to be subject to costume replacement before costume replacement, according to embodiments. FIG. 2B is a diagram of costume replacement data corresponding to a target part D, according to embodiments. FIG. 2C is a diagram of updated image set object data according to embodiments.

For example, it is assumed that the model to be subject to costume replacement includes parts A-H and the target part is part D. Before the target part D is subject to costume replacement, the image set object data corresponding to the model to be subject to costume replacement is shown in FIG. 2A, and FIG. 2A shows image data corresponding to each part in the image set object data. The costume replacement data corresponding to the target part D is shown in FIG. 2B. After the image data corresponding to the target part D in the image set object data is updated as the costume replacement data corresponding to the target part D, the obtained updated image set object data is shown in FIG. 2C.

Referring again to FIG. 1, the costume replacement method further includes the following step:

Step 105: Render the model to be subject to costume replacement according to the updated image set object data, to update a costume of the model to be subject to costume replacement.

When the model to be subject to costume replacement is rendered, the image data of each part is read from the updated image set object data to render the model to be subject to costume replacement, to update a costume of the model to be subject to costume replacement.

In the costume replacement method in these embodiments, the costume replacement data corresponding to the target part in a role (that is, the model to be subject to costume replacement) is directly copied to a memory space corresponding to the target part, so that a costume of the target part may be updated directly, and the costume may be a skin or clothes of the role. Therefore, according to these embodiments, the costume replacement data of the target part is directly updated, and the role can be subject to local quick costume replacement without obtaining skin resources of a whole set of models, so that a user can perform costume replacement on each part of the role conveniently, resource consumption for costume replacement performed by the user through a network is reduced while costume replacement flexibility of the role is improved, and the user can perform the costume replacement flexibly through the network.

Figure 3:
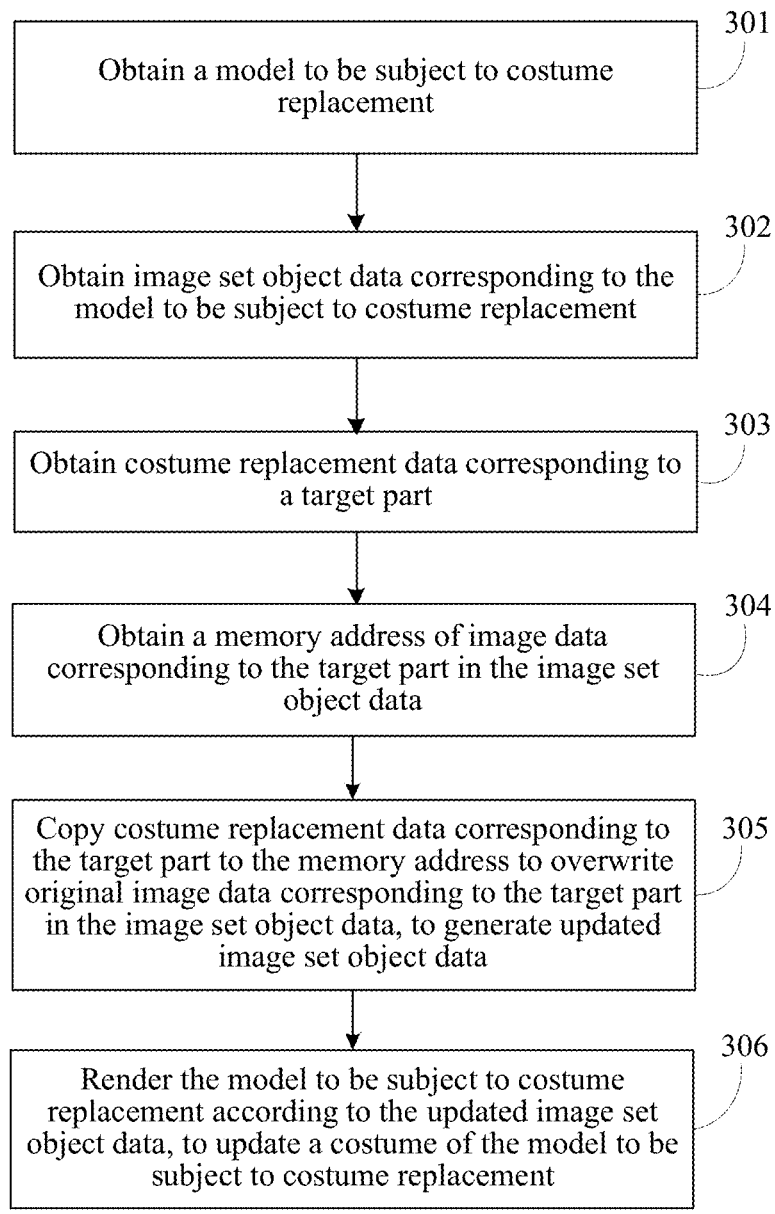
FIG. 3 is a flowchart of a costume replacement method according to embodiments.

FIG. 3 is a flowchart of a costume replacement method according to embodiments. The embodiments describe an example in which the costume replacement method is applied to a terminal device.

As shown in FIG. 3, the costume replacement method in these embodiments includes the following steps:

Step 301: Obtain a model to be subject to costume replacement.

The model to be subject to costume replacement includes a plurality of parts.

Each part of the model to be subject to costume replacement may be subject to costume replacement and a part is the smallest unit of costume replacement.

The model to be subject to costume replacement may be a person model, for example, a person model generated by a Spine skeleton model, and the person model includes parts such as a head, a body, arms, and legs.

The skeleton model generates the person model according to pictures of each skeleton of the person model and a relationship of each skeleton in the person model.

Step 302: Obtain image set object data corresponding to the model to be subject to costume replacement.

As an example implementation, the image set object data corresponding to the model to be subject to costume replacement may be obtained according to correspondence of identifier information of the model to be subject to costume replacement, a pre-stored identifier of the model, and the image set object data.

The image set object data includes a plurality of pieces of image data respectively corresponding to the plurality of parts in the model to be subject to costume replacement, and the image set object data is a set of all image data of each part of the model to be subject to costume replacement.

The image data is image data used by a costume or an outfit of a part of the model displayed in a scenario. For example, the image set object data includes a cap image, a clothes image, a glove image, and a trousers image of a person. The image set object data stores the data, so that the data may be loaded when the role is rendered, to generate a costume corresponding to the role.

Step 303: Obtain costume replacement data corresponding to a target part.

Step 304: Obtain a memory address of image data corresponding to the target part in the image set object data.

In embodiments, after the costume replacement data of the target part is obtained, the memory address of the image data corresponding to the target part in the image set object data may be obtained.

Specifically, the memory addresses corresponding to the image set object data may be obtained, and then, according to the memory addresses corresponding to the image set object data and a pixel coordinate and a pixel offset corresponding to the target part in the image set object data, the memory of the image data corresponding to the target part in the image set object data is determined.

For example, FIG. 2A shows a schematic diagram of the image set object data corresponding to the model to be subject to costume replacement, and it is assumed that the target part is part D and the pixel offset is zero. After a quantity of pixels occupied by each row in the image set object data and a quantity of bytes occupied by each pixel are obtained, according to the quantity of pixels occupied by each row, the quantity of bytes occupied by each pixel, the memory addresses corresponding to the image set object data, and a pixel coordinate of a pixel point D0 (a left upper vertex of an area where the image data corresponding to the target part D is located) in an image object, the memory address corresponding to the target part in the image set object data is calculated and determined, and it may be understood that, the memory address corresponding to the pixel D0 is the memory of the image data corresponding to the part D.

Step 305: Copy costume replacement data corresponding to the target part to the memory address to overwrite original image data corresponding to the target part in the image set object data, to generate the updated image set object data.

As an example implementation, after the memory address of the image data corresponding to the target part is obtained, the costume replacement data of the target part may be copied to a position of the original image data corresponding to the target part in the image set object data by using a memory copying function memcopy, that is, the costume replacement data corresponding to the target part overwrites the original image data corresponding to the target part in the image set object data, to update the image data of the target part in the image set object data.

A source address of the memory copying function memcopy points to an initial position of the memory address of the costume replacement data of the target part, and a destination address points to an initial address of the memory address of the original image data corresponding to the target part in the image set object data.

Step 306: Render the model to be subject to costume replacement according to the updated image set object data, to update a costume of the model to be subject to costume replacement.

When the model to be subject to costume replacement is rendered, the image data of each part is read from the updated image set object data to render the model to be subject to costume replacement, to update a costume of the model to be subject to costume replacement.

Figure 4A:
FIG. 4A is a diagram of an interface including a model to be subject to costume replacement, according to embodiments.
Figure 4B:
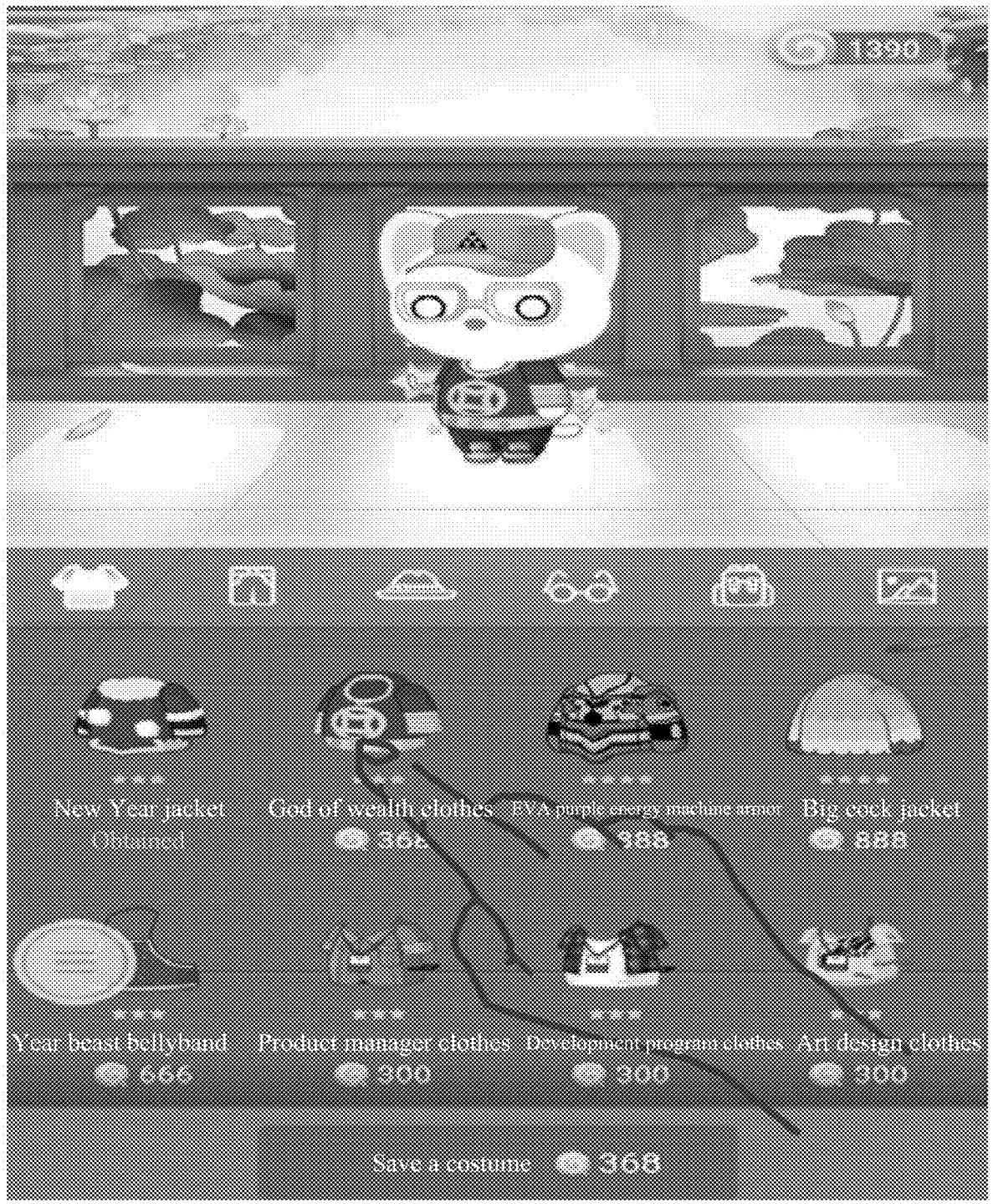
FIG. 4B is a diagram of a model after costume replacement, according to embodiments.

FIG. 4A is a diagram of an interface including a model to be subject to costume replacement, according to embodiments. FIG. 4B is a diagram of a model after costume replacement, according to embodiments.

For example, FIG. 4A shows a diagram of a first screen that includes an interface including the model to be subject to costume replacement, and at this time, a user may click a costume replacement control in the interface to call a costume selection interface. Referring to FIG. 4B, after the user triggers a God of wealth jacket in a costume selection interface included in a second screen, the image data of the God of wealth jacket overwrites image data corresponding to the target part in the image set object data of the model to be subject to costume replacement, to generate updated image set object data. After the model to be subject to costume replacement is rendered through the updated image set object data, the obtained updated model is shown in FIG. 4B. Therefore, flexible costume replacement of a jacket of the model is realized.

In the costume replacement method in these embodiments, the costume replacement data corresponding to the target part in a role (that is, the model to be subject to costume replacement) is directly copied to a memory space corresponding to the target part, so that a costume of the target part may be updated directly, and the costume may be a skin or clothes of the role. Therefore, according to these embodiments, the costume replacement data of the target part is directly updated, and the role can be subject to local quick costume replacement without obtaining skin resources of a whole set of models, so that a user can perform costume replacement on each part of the role conveniently, resource consumption for costume replacement performed by the user through a network is reduced while costume replacement flexibility of the role is improved, and the user can perform the costume replacement flexibly through the network.

Figure 5:
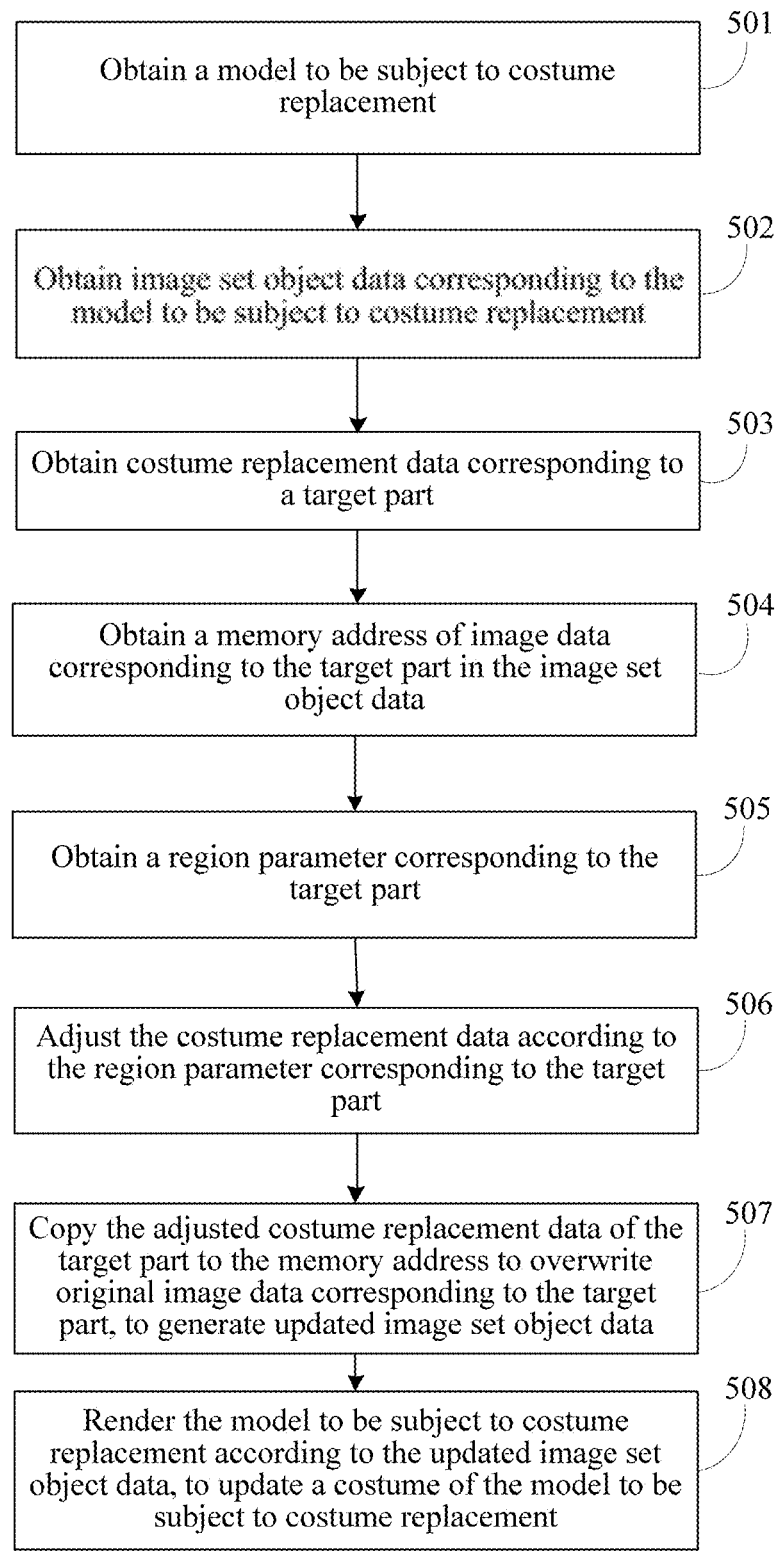
FIG. 5 is a flowchart of a costume replacement method according to embodiments.

FIG. 5 is a flowchart of a costume replacement method according to embodiments. These embodiments describe an example in which the costume replacement method is applied to a terminal device. As shown in FIG. 5, the costume replacement method in these embodiments includes the following steps:

Step 501: Obtain a model to be subject to costume replacement.

The model to be subject to costume replacement includes a plurality of parts.

Each part of the model to be subject to costume replacement may be subject to costume replacement and a part is the smallest unit of costume replacement.

The model to be subject to costume replacement may be a person model, for example, a person model generated by a Spine skeleton model, and the person model includes parts such as a head, a body, arms, and legs.

The skeleton model generates the person model according to pictures of each skeleton of the person model and a relationship of each skeleton in the person model.

Step 502: Obtain image set object data corresponding to the model to be subject to costume replacement.

As an example implementation, the image set object data corresponding to the model to be subject to costume replacement may be obtained according to correspondence of identifier information of the model to be subject to costume replacement, a pre-stored identifier of the model, and the image set object data.

The image set object data includes a plurality of pieces of image data respectively corresponding to the plurality of parts in the model to be subject to costume replacement, and the image set object data is a set of all image data of each part of the model to be subject to costume replacement.

The image data is image data used by a costume or an outfit of a part of the model displayed in a scenario. For example, the image set object data includes a cap image, a clothes image, a glove image, and a trousers image of a person. The image set object data stores the data, so that the data may be loaded when the role is rendered, to generate a costume corresponding to the role.

Step 503: Obtain costume replacement data corresponding to a target part.

Step 504: Obtain a memory address of image data corresponding to the target part in the image set object data.

Step 505: Obtain a region parameter corresponding to the target part.

As an example implementation, a region parameter of the target part is obtained from correspondence between pre-stored identifiers of the parts and region parameters according to identifier information corresponding to the target part.

The region parameter may include any one or any combination of a pixel coordinate, a pixel offset, a rotation amount, a length, and a width of the image data corresponding to the target part in the image set object data.

Step 506: Adjust the costume replacement data according to the region parameter corresponding to the target part.

In embodiments, to make the costume replacement data of the target part fit the model to be subject to costume replacement, an angle rotation operation and/or a resizing operation is performed on the costume replacement data according to the region parameter corresponding to the target part.

Whether a rotation amount in the region parameter corresponding to the target part is not zero may be determined, if it is determined that the rotation amount is not zero, a corresponding angle rotation is performed on the costume replacement data according to the rotation amount.

When it is determined that the costume replacement data of the target part does not fit the model to be subject to costume replacement data according to length and width information in the region parameter, a resizing operation may be performed on the costume replacement data of the target part according to a length and a width of the region parameter.

Step 507: Copy the adjusted costume replacement data of the target part to the memory address to overwrite original image data corresponding to the target part, to generate updated image set object data.

Step 508: Render the model to be subject to costume replacement according to the updated image set object data, to update a costume of the model to be subject to costume replacement.

When the model to be subject to costume replacement is rendered, the image data of each part is read from the updated image set object data to render the model to be subject to costume replacement, to update a costume of the model to be subject to costume replacement.

In the costume replacement apparatus in these embodiments, the costume replacement data corresponding to the target part is adjusted according to the region parameter corresponding to the target part in a role (that is, the model to be subject to costume replacement), and the adjusted costume replacement data of the target part is copied to a memory space corresponding to the target part, the costume of the target part may be updated directly, and the costume may be a skin, clothes, or the like of the role. Therefore, according to these embodiments, the costume replacement data of the target part is directly updated, and the role can be subject to local quick costume replacement without obtaining skin resources of a whole set of models, so that a user can perform costume replacement on each part of the role conveniently, resource consumption for costume replacement performed by the user through a network is reduced while costume replacement flexibility of the role is improved, and the user can perform the costume replacement flexibly through the network.

Figure 6:
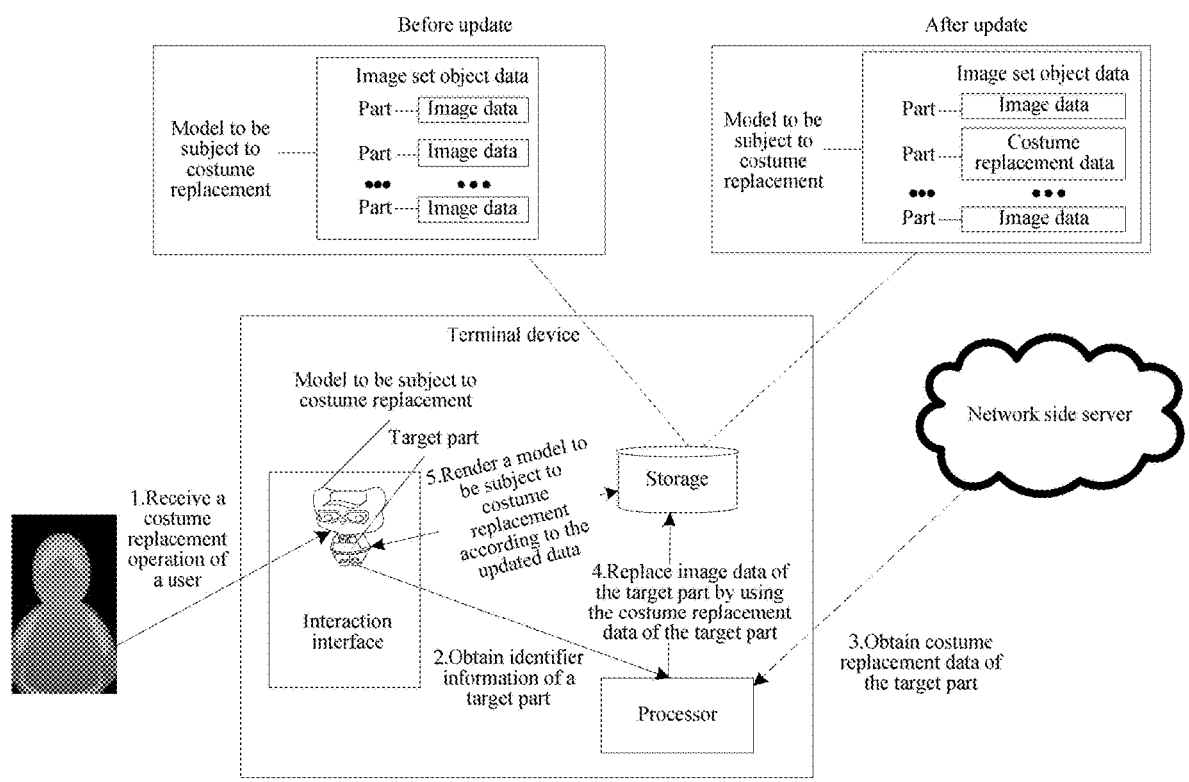
FIG. 6 is a schematic diagram of interaction procedures of a costume replacement method according to embodiments.

FIG. 6 is a schematic diagram of interaction procedures of a costume replacement method according to embodiments. These embodiments describe an example in which a terminal device obtains costume replacement data of a target part from a network side server. A costume replacement process of a model to be subject to costume replacement in an interaction interface of the terminal device includes: determining, by a processor in the terminal device, identifier information of a target part according to a costume replacement operation of a user; obtaining, by the processor, costume replacement data of the target part from the network side server according to the identifier information of the target part; obtaining, by the processor, image set object data of the model to be subject to costume replacement from a storage according to identifier information of the model to be subject to costume replacement; controlling, by the processor, replacement of original image data of the target part in the image set object data, in the storage, by using the costume replacement data of the target part; and reading, by the processor, when rendering the model to be subject to costume replacement, the image data of each part from updated image set object data to render the model to be subject to costume replacement, to update a costume of the model to be subject to costume replacement.

In the costume replacement method in these embodiments, the costume replacement data corresponding to the target part in a role (that is, the model to be subject to costume replacement) is directly copied to a memory space corresponding to the target part, so that a costume of the target part may be updated directly, and the costume may be a skin or clothes of the role. Therefore, according to these embodiments, the costume replacement data of the target part is directly updated, and the role can be subject to local quick costume replacement without obtaining skin resources of a whole set of models, so that a user can perform costume replacement on each part of the role conveniently, resource consumption for costume replacement performed by the user through a network is reduced while costume replacement flexibility of the role is improved, and the user can perform the costume replacement flexibly through the network.

Figure 7:
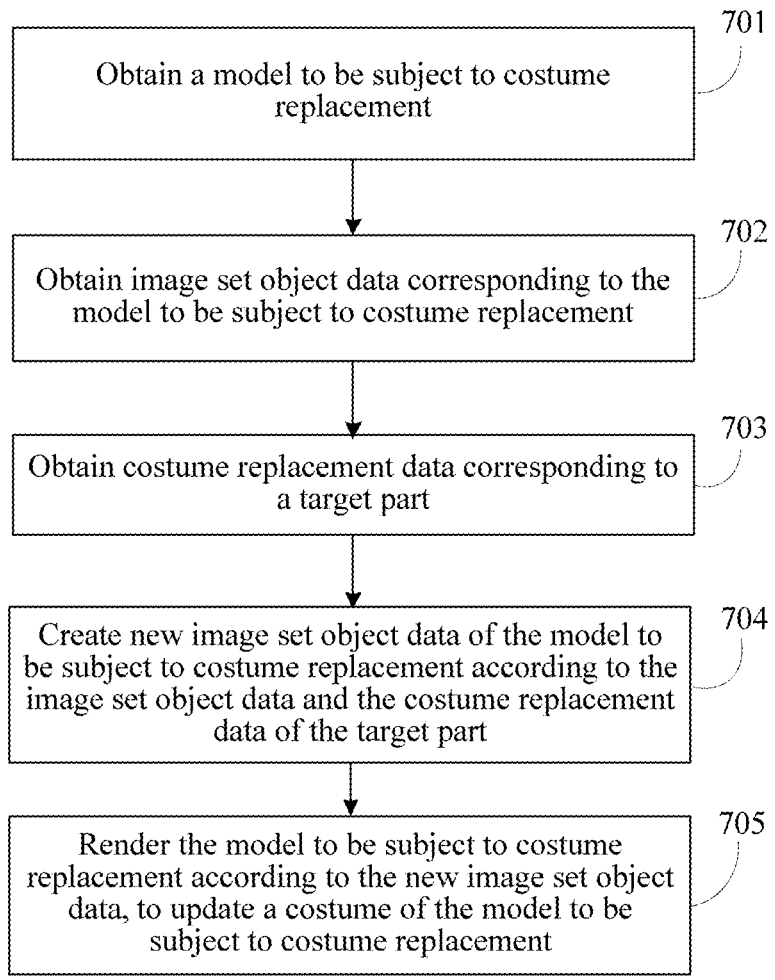
FIG. 7 is a flowchart of a costume replacement method according to embodiments.

FIG. 7 is a flowchart of a costume replacement method according to embodiments. These embodiments describe an example in which the costume replacement method is applied to a terminal device. As shown in FIG. 7, the costume replacement method in these embodiments includes the following steps:

Step 701: Obtain a model to be subject to costume replacement.

The model to be subject to costume replacement includes a plurality of parts.

Each part of the model to be subject to costume replacement may be subject to costume replacement and a part is the smallest unit of costume replacement.

The model to be subject to costume replacement may be a person model, for example, a person model generated by a Spine skeleton model, and the person model includes parts such as a head, a body, arms, and legs.

The skeleton model generates the person model according to pictures of each skeleton of the person model and a relationship of each skeleton in the person model.

Step 702: Obtain image set object data corresponding to the model to be subject to costume replacement.

As an example implementation, the image set object data corresponding to the model to be subject to costume replacement may be obtained according to correspondence of identifier information of the model to be subject to costume replacement, a pre-stored identifier of the model, and the image set object data. The image set object data includes a plurality of pieces of image data respectively corresponding to the plurality of parts in the model to be subject to costume replacement, and the image set object data is a set of all image data of each part of the model to be subject to costume replacement.

The image data is image data used by a costume or an outfit of a part of the model displayed in a scenario. For example, the image set object data includes a cap image, a clothes image, a glove image, and a trousers image of a person. The image set object data stores the data, so that the data may be loaded when the role is rendered, to generate a costume corresponding to the role.

Step 703: Obtain costume replacement data corresponding to a target part.

In embodiments, the costume replacement data corresponding to the target part may be obtained in many manners. The examples of the manners are described as follows.

As an example, the costume replacement data of the target part is obtained from a local resource database.

Specifically, when a user needs to replace a costume of the model to be subject to costume replacement, the terminal device receives a costume replacement instruction of the user, and the costume replacement instruction includes an identifier of the model to be subject to costume replacement and an identifier of the target part.

Correspondingly, the terminal device queries the local resource database according to the identifier of the model to be subject to costume replacement and the identifier of the target part, to obtain the costume replacement data of the target part.

As another example, the costume replacement data of the target part is obtained from a server.

Specifically, when a user needs to replace a costume of the model to be subject to costume replacement, the terminal device receives a costume replacement instruction of the user, and the costume replacement instruction includes an identifier of the model to be subject to costume replacement and an identifier of the target part.

Correspondingly, the terminal device sends a resource obtaining request including the identifier of the model to be subject to costume replacement and the identifier of the target part to the server, so that the server obtains costume replacement data of the target part according to the identifier of the model to be subject to costume replacement and the identifier of the target part and returns the costume replacement data of the target part to the terminal device.

Correspondingly, the terminal device receives the costume replacement data of the target part sent by the server.

When the user needs to replace a costume of the model to be subject to costume replacement, the terminal device receives a costume replacement instruction of the user, and the costume replacement instruction includes an identifier of the model to be subject to costume replacement and an identifier of the target part.

When the terminal device does not find the costume replacement data corresponding to the target part in the local resource database according to the identifier of the model to be subject to costume replacement and the identifier of the target part, the terminal device sends the resource obtaining request including the identifier of the model to be subject to costume replacement and the identifier of the target part to the server, so that the server obtains the costume replacement data of the target part according to the identifier of the model to be subject to costume replacement and the identifier of the target part and returns the costume replacement data of the target part to the terminal device. Correspondingly, the terminal device receives the costume replacement data of the target part sent by the server.

Step 704: Create new image set object data of the model to be subject to costume replacement according to the image set object data and the costume replacement data of the target part.

As an example implementation, except the image data corresponding to the target part, image data of other parts in the image set object data may be obtained, and region parameters corresponding to each of the parts are obtained. Then, new image set object data is created according to the costume replacement data of the target part, the region parameters of each of the parts and the image data of the other parts.

The region parameters may include any one or any combination of a pixel coordinate, a pixel offset, a rotation amount, a length, and a width of the image data corresponding to the corresponding part in the image set object data.

The new image set object data includes a plurality of pieces of image data respectively corresponding to the plurality of parts in the model to be subject to costume replacement, and the image set object data is a set of all image data of each part of the model to be subject to costume replacement.

It may be understood that, after the new image set object data of the model to be subject to costume replacement is created, the model to be subject to costume replacement points to the new image set object data. For example, it is assumed that the model to be subject to costume replacement includes parts A-H. The image set object data corresponding to the model to be subject to costume replacement is shown in FIG. 2A. It is assumed that the costume replacement data corresponding to the target part D is shown in FIG. 2B. At this time, except the image data corresponding to the target part, the other image data in the image set object data may be obtained. Then, the new image set object data of the model to be subject to costume replacement is created according to the other image data and the costume replacement data of the target part. The created new image set object data and the updated image set object data are in the same form, as shown in FIG. 2C.

Step 705: Render the model to be subject to costume replacement according to the new image set object data, to update a costume of the model to be subject to costume replacement.

When the model is rendered by a role engine, the image data corresponding to each part of the model to be subject to costume replacement is read from the new image set object data corresponding to the model to be subject to costume replacement to perform rendering, to obtain a model subject to costume replacement.

In the costume replacement method in these embodiments, the new image set object data is created according to the costume replacement data corresponding to the target part in a role (that is, the model to be subject to costume replacement) and the image set object data, and the model to be subject to costume replacement is rendered according to the new image set object data, to update a costume of the model to be subject to costume replacement. The costume may be a skin, clothes, or the like of the role. Therefore, the target part can be subject to local quick costume replacement without obtaining skin resources of a whole set of models, so that a user can perform costume replacement on each part of the model conveniently, resource consumption for the costume replacement performed by the user through a network is reduced while costume replacement flexibility of the model is improved, and the user can perform the costume replacement flexibly through the network.

Figure 8:
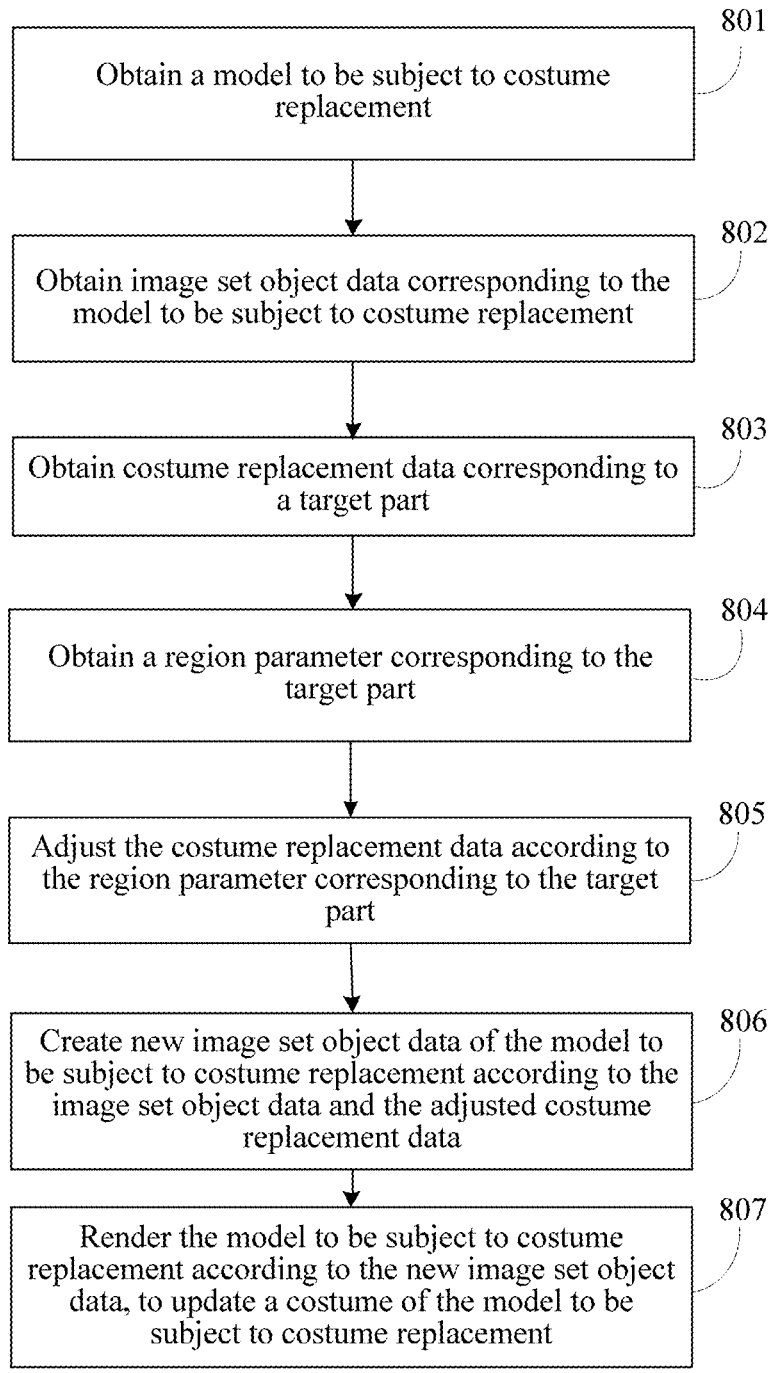
FIG. 8 is a flowchart of a costume replacement method according to embodiments.

FIG. 8 is a flowchart of a costume replacement method according to embodiments. These embodiments describe an example in which the costume replacement method is applied to a terminal device. As shown in FIG. 8, the costume replacement method in these embodiments includes the following steps:

Step 801: Obtain a model to be subject to costume replacement.

Step 802: Obtain image set object data corresponding to the model to be subject to costume replacement.

Step 803: Obtain costume replacement data corresponding to a target part.

It may be noted that, the foregoing explanations and descriptions for steps 701-703 are also suitable for steps 801-803, and therefore, steps 801-803 will not be repeated herein.

Step 804: Obtain a region parameter corresponding to the target part.

As an example implementation, a region parameter of the target part is obtained from correspondence between pre-stored identifiers of the parts and region parameters according to identifier information corresponding to the target part.

The region parameter may include any one or any combination of a pixel coordinate, a pixel offset, a rotation amount, a length, and a width of the image data corresponding to the target part in the image set object data.

Step 805: Adjust the costume replacement data according to the region parameter corresponding to the target part.

In embodiments, to make the costume replacement data of the target part fit the model to be subject to costume replacement, an angle rotation operation and/or a resizing operation is performed on the costume replacement data according to the region parameter corresponding to the target part.

Whether a rotation amount in the region parameter corresponding to the target part is not zero may be determined, if it is determined that the rotation amount is not zero, a corresponding angle rotation is performed on the costume replacement data according to the rotation amount.

When it is determined that the costume replacement data of the target part does not fit the model to be subject to costume replacement data according to length and width information in the region parameter, a resizing operation may be performed on the costume replacement data of the target part according to a length and a width of the region parameter.

Step 806: Create new image set object data of the model to be subject to costume replacement according to the image set object data and the adjusted costume replacement data.

Step 807: Render the model to be subject to costume replacement according to the new image set object data, to update a costume of the model to be subject to costume replacement.

When the model to be subject to costume replacement is rendered, the image data of each part is read from the new image set object data to render the model to be subject to costume replacement, to update a costume of the model to be subject to costume replacement.

In the costume replacement method in these embodiments, the costume replacement data of the target part is adjusted according to the region parameter corresponding to the target part in a role (that is, the model to be subject to costume replacement), the new image set object data is created according to the image set object data and the adjusted costume replacement data of the target part, and the model to be subject to costume replacement is rendered according to the new image set object data, to update a costume of the model to be subject to costume replacement. The costume may be a skin, clothes, or the like of the role. Therefore, the target part can be subject to local quick costume replacement without obtaining skin resources of a whole set of models, so that a user can perform costume replacement on each part of the model conveniently, resource consumption for the costume replacement performed by the user through a network is reduced while costume replacement flexibility of the model is improved, and the user can perform the costume replacement flexibly through the network.

Figure 9:
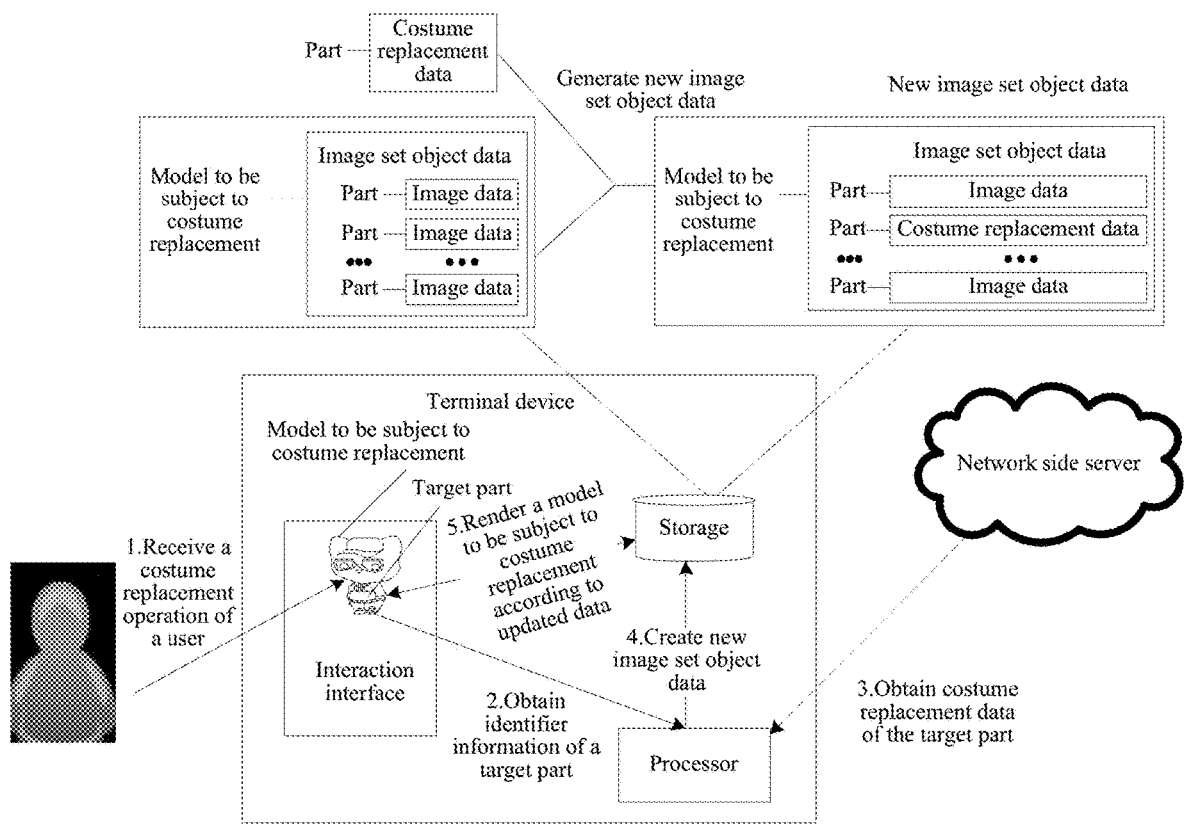
FIG. 9 is a schematic diagram of interaction procedures of a costume replacement method according to embodiments.

FIG. 9 is a schematic diagram of interaction procedures of a costume replacement method according to embodiments. These embodiments describe an example in which a terminal device obtains costume replacement data of a target part from a network side server. A costume replacement process of a model to be subject to costume replacement in an interaction interface of the terminal device includes: determining, by a processor in the terminal device, identifier information of a target part according to a costume replacement operation of a user; obtaining, by the processor, costume replacement data of the target part from the network side server according to the identifier information of the target part; obtaining, by the processor, image set object data of the model to be subject to costume replacement from a storage according to identifier information of the model to be subject to costume replacement; controlling, by the processor, creation of new image set object data according to the costume replacement data of the target part and original image data of the part in the image set object data, in the storage; and reading, by the processor, when rendering the model to be subject to costume replacement, the image data of each part from the new image set object data to render the model to be subject to costume replacement, to update a costume of the model to be subject to costume replacement.

In the costume replacement method in these embodiments, the new image set object data is created according to the costume replacement data corresponding to the target part in a role (that is, the model to be subject to costume replacement) and the image set object data, and the model to be subject to costume replacement is rendered according to the new image set object data, to update a costume of the model to be subject to costume replacement. The costume may be a skin, clothes, or the like of the role. Therefore, the target part can be subject to local quick costume replacement without obtaining skin resources of a whole set of models, so that a user can perform costume replacement on each part of the model conveniently, resource consumption for the costume replacement performed by the user through a network is reduced while costume replacement flexibility of the model is improved, and the user can perform the costume replacement flexibly through the network.

To implement the foregoing embodiments, this application further provides a costume replacement apparatus.

Figure 10:
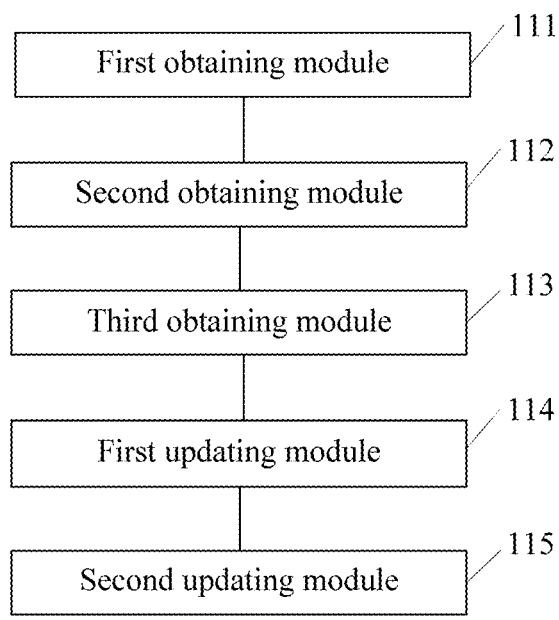
FIG. 10 is a schematic structural diagram of a costume replacement apparatus according to embodiments.
Figure 11:
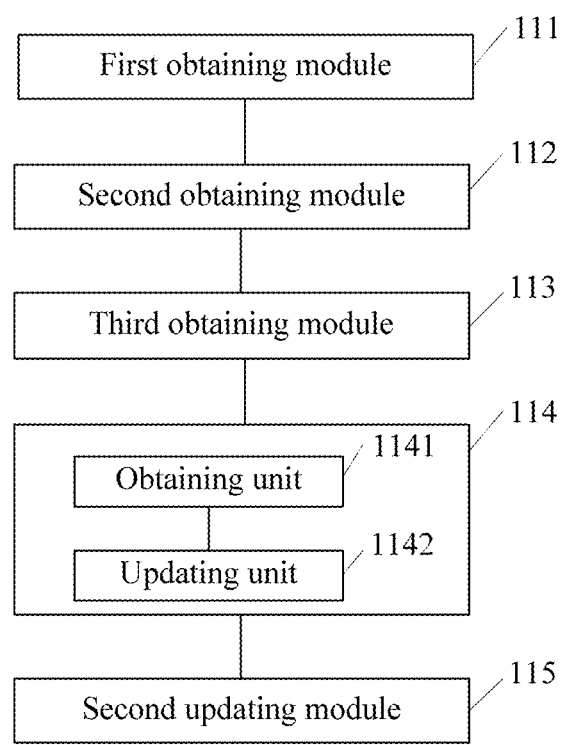
FIG. 11 is a schematic structural diagram of a costume replacement apparatus according to embodiments.
Figure 12:
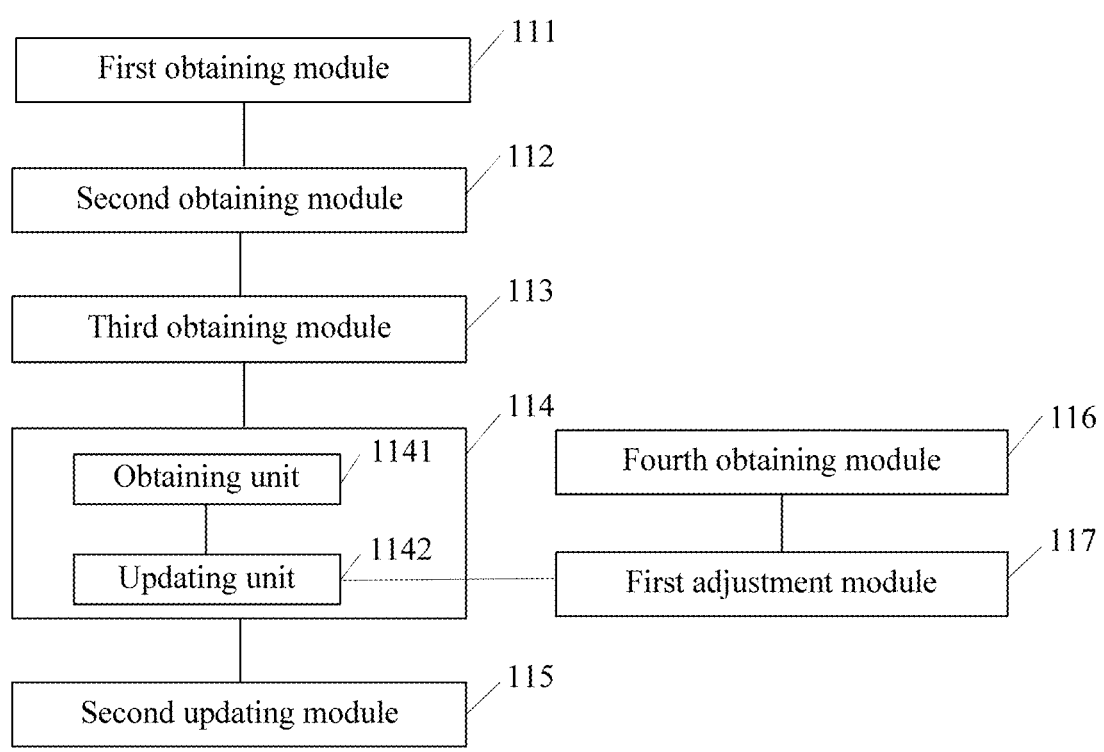
FIG. 12 is a schematic structural diagram of a costume replacement apparatus according to embodiments.

FIG. 10 is a schematic structural diagram of a costume replacement apparatus according to embodiments. FIG. 11 is a schematic structural diagram of a costume replacement apparatus according to embodiments. FIG. 12 is a schematic structural diagram of a costume replacement apparatus according to embodiments.

As shown in FIG. 10, the costume replacement apparatus according to these embodiments may include a first obtaining module 111, a second obtaining module 112, a third obtaining module 113, a first updating module 114, and a second updating module 115.

The first obtaining module 111 is configured to obtain a model to be subject to costume replacement.

The model to be subject to costume replacement includes a plurality of parts.

Each part of the model to be subject to costume replacement may be subject to costume replacement and a part is the smallest unit of costume replacement.

The model to be subject to costume replacement may be a person model, for example, a person model generated by a Spine skeleton model, and the person model includes parts such as a head, a body, arms, and legs.

The skeleton model generates the person model according to pictures of each skeleton of the person model and a relationship of each skeleton in the person model.

The second obtaining module 112 is configured to obtain image set object data corresponding to the model to be subject to costume replacement.

The image set object data includes a plurality of pieces of image data respectively corresponding to the plurality of parts in the model to be subject to costume replacement, and the image set object data is a set of all image data of each part of the model to be subject to costume replacement.

The image data is image data used by a costume or an outfit of a part of the model displayed in a scenario. For example, the image set object data includes a cap image, a clothes image, a glove image, and a trousers image of a person. The image set object data stores the data, so that the data may be loaded when the role is rendered, to generate a costume corresponding to the role.

The third obtaining module 113 is configured to obtain costume replacement data corresponding to a target part.

The first updating module 114 is configured to update image data corresponding to the target part in the image set object data according to the costume replacement data corresponding to the target part, to generate updated image set object data.

The second updating module 115 is configured to render the model to be subject to costume replacement according to the updated image set object data, to update a costume of the model to be subject to costume replacement.

In embodiments, based on FIG. 10, as shown in FIG. 11, the first updating module 114 may include an obtaining unit 1141 and an updating unit 1142.

The obtaining unit 1141 is configured to obtain a memory address of the image data corresponding to the target part in the image set object data.

The updating unit 1142 is configured to copy the costume replacement data corresponding to the target part to a memory address to overwrite original image data corresponding to the target part, to generate the updated image set object data.

In embodiments, based on FIG. 11, as shown in FIG. 12, the apparatus further includes a fourth obtaining module 116 and a first adjustment module 117.

The fourth obtaining module 116 is configured to obtain a region parameter corresponding to the target part.

The first adjustment module 117 is configured to adjust the costume replacement data according to the region parameter corresponding to the target part.

In embodiments, the first adjustment module 117 is specifically configured to: perform an angle rotation operation and/or a resizing operation on the costume replacement data according to the region parameter corresponding to the target part.

The region parameter includes any one or any combination of a pixel coordinate, a pixel offset, a rotation amount, a length, and a width of the image data of the target part in the image set object data.

It may be noted that, the foregoing explanations and descriptions of the costume replacement method are also suitable for the costume replacement apparatus in these embodiments, and will not be repeated herein.

In the costume replacement apparatus in these embodiments, the costume replacement data corresponding to the target part in a role (that is, the model to be subject to costume replacement) is directly copied to a memory space corresponding to the target part, so that a costume of the target part may be updated directly, and the costume may be a skin, clothes, or the like of the role. Therefore, according to these embodiments, the costume replacement data of the target part is directly updated, and the role can be subject to local quick costume replacement without obtaining skin resources of a whole set of models, so that a user can perform costume replacement on each part of the role conveniently, resource consumption for costume replacement performed by the user through a network is reduced while costume replacement flexibility of the role is improved, and the user can perform the costume replacement flexibly through the network.

To implement the foregoing embodiments, this application further provides another costume replacement apparatus.

Figure 13:
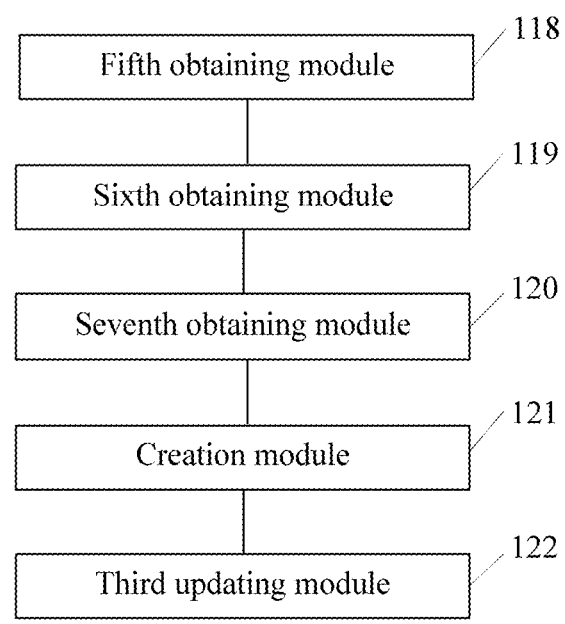
FIG. 13 is a schematic structural diagram of a costume replacement apparatus according to embodiments.
Figure 14:
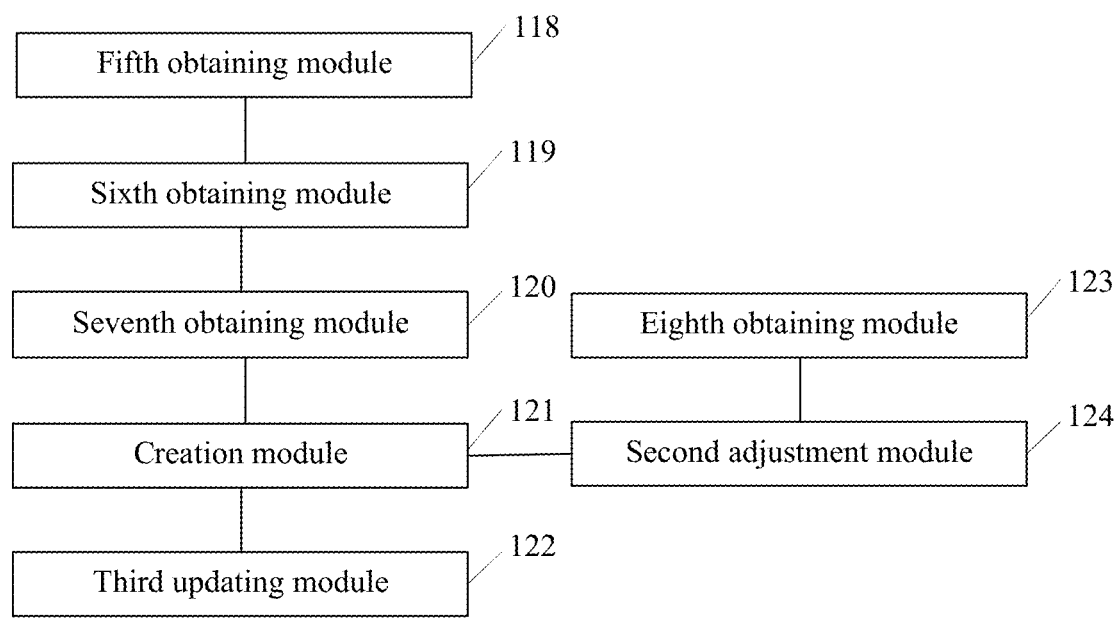
FIG. 14 is a schematic structural diagram of a costume replacement apparatus according to embodiments.

FIG. 13 is a schematic structural diagram of a costume replacement apparatus according to embodiments. FIG. 14 is a schematic structural diagram of a costume replacement apparatus according to embodiments.

As shown in FIG. 13, the costume replacement apparatus according to these embodiments may include a fifth obtaining module 118, a sixth obtaining module 119, a seventh obtaining module 120, a creation module 121, and a third updating module 122.

The fifth obtaining module 118 is configured to obtain a model to be subject to costume replacement.

The model to be subject to costume replacement includes a plurality of parts.

Each part of the model to be subject to costume replacement may be subject to costume replacement and a part is the smallest unit of costume replacement.

The model to be subject to costume replacement may be a person model, for example, a person model generated by a Spine skeleton model, and the person model includes parts such as a head, a body, arms, and legs.

The sixth obtaining module 119 is configured to obtain image set object data corresponding to the model to be subject to costume replacement.

The image set object data includes a plurality of pieces of image data respectively corresponding to the plurality of parts in the model to be subject to costume replacement, and the image set object data is a set of all image data of each part of the model to be subject to costume replacement.

The image data is image data used by a costume or an outfit of a part of the model displayed in a scenario. For example, the image set object data includes a cap image, a clothes image, a glove image, and a trousers image of a person. The image set object data stores the data, so that the data may be loaded when the role is rendered, to generate a costume corresponding to the role.

The seventh obtaining module 120 is configured to obtain costume replacement data corresponding to a target part.

The creation module 121 is configured to create new image set object data of the model to be subject to costume replacement according to the image set object data and the costume replacement data of the target part.

The third updating module 122 is configured to render the model to be subject to costume replacement according to the new image set object data, to update a costume of the model to be subject to costume replacement.

In embodiments, to make the costume replacement data of the target part fit the model to be subject to costume replacement, based on FIG. 13, as shown in FIG. 14, the apparatus further includes an eighth obtaining module 123 and a second adjustment module 124.

The eighth obtaining module 123 is configured to obtain a region parameter corresponding to the target part.

The second adjustment module 124 is configured to adjust the costume replacement data according to the region parameter corresponding to the target part.

In embodiments, the creation module 121 is further configured to create new image set object data of the model to be subject to costume replacement according to the image set object data and the adjusted costume replacement data.

In embodiments, the second adjustment module 124 is specifically configured to: perform an angle rotation operation and/or a resizing operation on the costume replacement data according to the region parameter corresponding to the target part.

The region parameter includes any one or any combination of a pixel coordinate, a pixel offset, a rotation amount, a length, and a width of the image data of the target part in the image set object data.

It may be noted that, the foregoing explanations and descriptions of the costume replacement method are also suitable for the costume replacement apparatus in these embodiments, and will not be repeated herein.

In the costume replacement method in these embodiments, the new image set object data is created according to the costume replacement data corresponding to the target part in a role (that is, the model to be subject to costume replacement) and the image set object data, and the model to be subject to costume replacement is rendered according to the new image set object data, to update a costume of the model to be subject to costume replacement. The costume may be a skin, clothes, or the like of the role. Therefore, the target part can be subject to local quick costume replacement without obtaining skin resources of a whole set of models, so that a user can perform costume replacement on each part of the model conveniently, resource consumption for the costume replacement performed by the user through a network is reduced while costume replacement flexibility of the model is improved, and the user can perform the costume replacement flexibly through the network.

Figure 15:
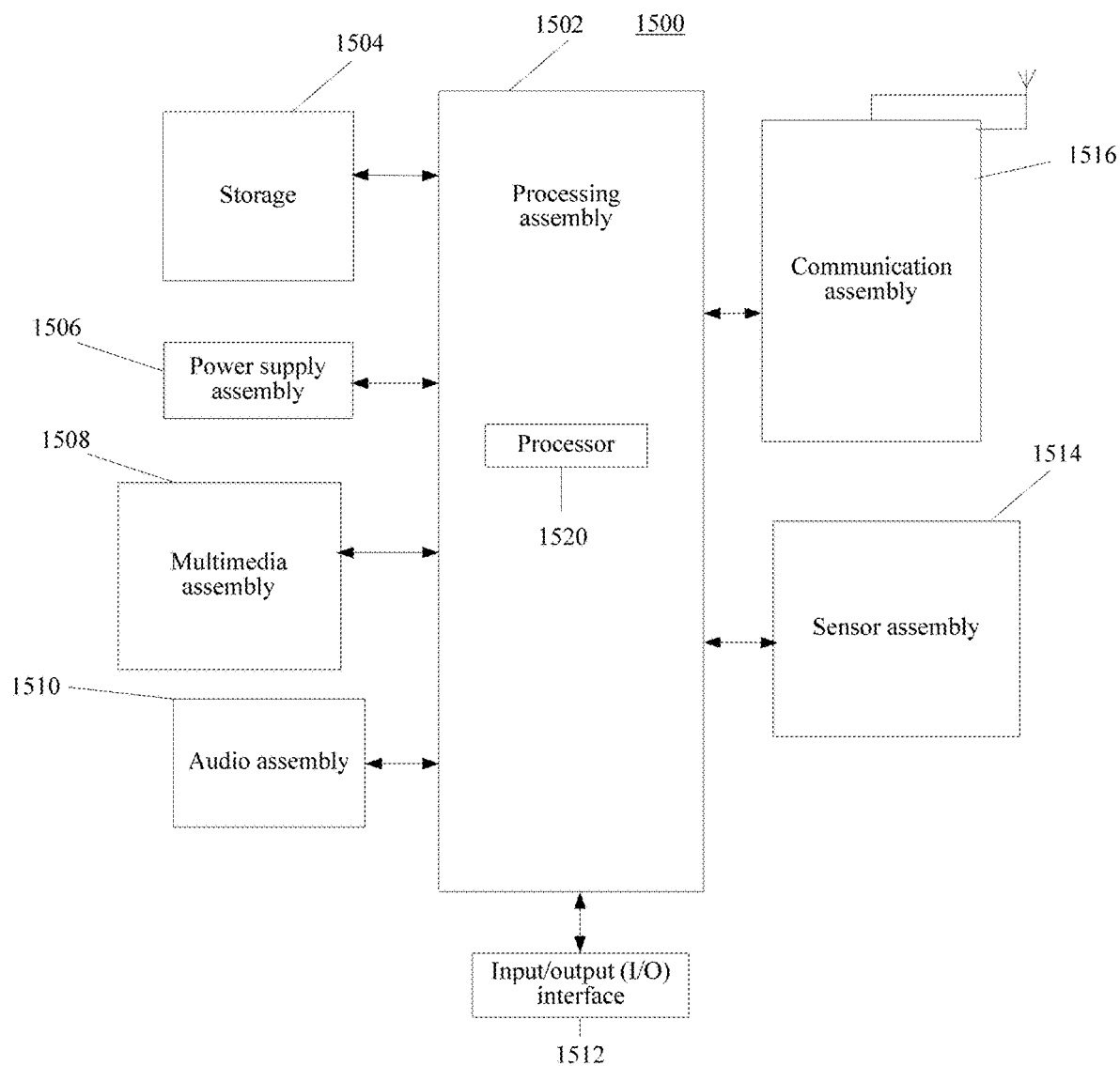
FIG. 15 is a block diagram of a costume replacement apparatus according to embodiments.

FIG. 15 is a block diagram of a costume replacement apparatus 1500 according to embodiments.

Referring to FIG. 15, the apparatus 1500 may include any one or any combination of the following assemblies: a processing assembly 1502, a storage 1504, a power supply assembly 1506, a multimedia assembly 1508, an audio assembly 1510, an input/output (I/O) interface 1512, a sensor assembly 1514, and a communication assembly 1516.

The processing assembly 1502 usually controls the whole operation of the apparatus 1500, such as operations associated with displaying, a phone call, data communication, a camera operation, and a recording operation. The processing assembly 1502 may include at least one processor 1520 to execute instructions, to complete all or some steps of the foregoing method. In addition, the processing assembly 1502 may include one or more modules, to facilitate the interaction between the processing assembly 1502 and other assemblies. For example, the processing assembly 1502 may include a multimedia module, to facilitate the interaction between the multimedia assembly 1508 and the processing assembly 1502.

The storage 1504 is configured to store various types of data to support operations on the apparatus 1500. Examples of the data include instructions, contact data, phonebook data, messages, pictures, videos, and the like of any application or method used to be operated on the apparatus 1500. The storage 1504 can be implemented by any type of volatile or non-volatile storage devices or a combination thereof, such as a static random access memory (SRAM), an electrically erasable programmable read-only memory (EPROM), a programmable read-only memory (PROM), a read-only memory (ROM), a magnetic memory, a flash memory, a magnetic disc, or an optical disc.

The power supply assembly 1506 provides power to various assemblies of the apparatus 1500. The power supply assembly 1506 may include a power supply management system, one or more power supplies, and other assemblies associated with generating, managing and allocating power for the apparatus 1500.

The multimedia assembly 1508 includes a touch display screen providing an output interface between the apparatus 1500 and a user. In some embodiments, the touch display screen may include a liquid crystal display (LCD) and a touch panel (TP). The TP includes one or more touch sensors to sense touching, sliding, and gestures on the TP. The touch sensor may not only sense the boundary of touching or sliding operations, but also detect duration and pressure related to the touching or sliding operations. In some embodiments, the multimedia assembly 1508 includes a front camera and/or a rear camera. When the apparatus 1500 is in an operation mode, such as a shoot mode or a video mode, the front camera and/or the rear camera may receive external multimedia data. Each front camera and rear camera may be a fixed optical lens system or have a focal length and an optical zooming capability.

The audio assembly 1510 is configured to output and/or input an audio signal. For example, the audio assembly 1510 includes a microphone (MIC), and when the apparatus 1500 is in an operation mode, such as a call mode, a recording mode, and a voice identification mode, the MIC is configured to receive an external audio signal. The received audio signal may be further stored in the storage 1504 or sent through the communication assembly 1516. In some embodiments, the audio assembly 1510 further includes a loudspeaker, configured to output an audio signal.

The I/O interface 1512 provides an interface between the processing assembly 1502 and an external interface module. The external interface module may be a keyboard, a click wheel, buttons, or the like. The buttons may include, but not limited to: a homepage button, a volume button, a start-up button, and a locking button.

The sensor assembly 1514 includes one or more sensors, configured to provide status evaluation in each aspect to the apparatus 1500. For example, the sensor assembly 1514 may detect an opened/closed status of the apparatus 1500, and relative positioning of the assembly. For example, the assembly is a display and a small keyboard of the apparatus 1500. The sensor assembly 1514 may further detect the position change of the apparatus 1500 or one assembly of the apparatus 1500, the existence or nonexistence of contact between the user and the apparatus 1500, the azimuth or acceleration/deceleration of the apparatus 1500, and the temperature change of the apparatus 1500. The sensor assembly 1514 may include a proximity sensor, configured to detect the existence of nearby objects without any physical contact. The sensor assembly 1514 may further include an optical sensor, such as a CMOS or CCD image sensor, that is used in an imaging application. In some embodiments, the sensor assembly 1514 may further include an acceleration sensor, a gyroscope sensor, a magnetic sensor, a pressure sensor, or a temperature sensor.

The communication assembly 1516 is configured to facilitate communication in a wired or wireless manner between the apparatus 1500 and other devices. The apparatus 1500 may access a wireless network based on communication standards, such as Wi-Fi, 2G, or 3G, or a combination thereof. In embodiments, the communication assembly 1516 receives a broadcast signal or broadcast related information from an external broadcast management system via a broadcast channel. In embodiments, the communication assembly 1516 further includes a near field communication (NFC) module, to promote short range communication. For example, the NFC module may be implemented based on a radio frequency identification (RFID) technology, an infrared data association (IrDA) technology, an ultra wideband (UWB) technology, a Bluetooth (BT) technology, and other technologies.

In embodiments, the apparatus 1500 can be implemented as one or more application-specific integrated circuit (ASIC), a digital signal processor (DSP), a digital signal processing device (DSPD), a programmable logic device (PLD), a field programmable gate array (FPGA), a controller, a micro-controller, a microprocessor or other electronic element, to perform the costume replacement method.

To implement the foregoing embodiments, this application provides a non-volatile computer storage medium. The computer storage medium stores one or more programs, when the one or more programs are executed by a device, the device performs the costume replacement method in the embodiments in the first aspect of this application.

To implement the foregoing embodiments, this application provides a non-volatile computer storage medium. The computer storage medium stores one or more programs, when the one or more programs are executed by a device, the device performs the costume replacement method in the embodiments in the second aspect of this application.

In the description of the specification, the descriptions with reference to the terms "an embodiment," "some embodiments," "examples," "specific examples," or "some examples" mean that specific features, structures, materials, or features described with reference to the embodiments or examples are included in at least one embodiment or example of this application. In the specification, the schematic expressions of the terms do not need to aim at the same embodiments or examples. Furthermore, the specific features, structures, materials or features described may be combined in one or more embodiments or examples in a suitable manner. Furthermore, in a condition of no contradiction, a person skilled in the art may combine the different embodiments or examples and the features in the different embodiments or examples described in the specification.

In addition, the terms such as "first" and "second" are used only for the purpose of description, and may not be understood as indicating or implying the relative importance or implicitly specifying the number of the indicated technical features. Therefore, a feature defined by "first" or "second" can explicitly or implicitly include either one or both of said features. In the description of this application, unless otherwise stated, "a plurality of" means two or more than two.

The description for any procedure or method described in the flowcharts or described herein in other manners can be understood to express including one or more modules, segments, or parts of code of executable instructions used for implementing steps of specific logic functions or processes, and furthermore, the scope of the implementations of this application includes additional implementation, and the functions may be performed not in a shown or discussed sequence, including a basically simultaneous sequence or an opposite sequence according to the involved functions, which may be understood by a person of skilled in the art to which the embodiments of this application belong.

Logics and/or steps described in the flowcharts or described herein in other manners, for example, can be understood as a sequencing list of executable instructions for implementing logic functions and can be specifically implemented in any computer readable medium, to be used by an instruction execution system, apparatus or device (such as a system based on a computer, a system including a processor, or a system capable of obtaining an instruction from the instruction execution system, apparatus or device and executing the instruction), or to be used in combination with the instruction execution system, apparatus or device. In the specification of this application, the "computer readable medium" may be any apparatus that can include, store, communicate, propagate, or transmit programs to be used by the instruction execution system, apparatus or device or to be used in combination with the instruction execution system, apparatus or device. The computer readable medium includes more specific examples (a non-exhaustive list): an electric connection part (electronic apparatus) having one or more wirings, a portable computer disk cartridge (magnetic apparatus), a random access memory (RAM), a read-only memory (ROM), an erasable programmable ROM (EPROM or flash memory), an optical fiber apparatus, or a portable CD ROM (CDROM). In addition, the computer readable medium may even be paper on which the program may be printed or another suitable medium. This is because the program may be obtained in an electronic manner, for example, by optically scanning the paper or medium, then editing and decoding the program, or processing the program in another suitable manner, and then the program is stored in a computer memory.

It may be understood that, each part of this application may be implemented by hardware, software, firmware, or a combination thereof. In the foregoing implementations, a plurality of steps or methods may be implemented by software or firmware stored in the memory or executed by a suitable instruction executing system. For example, if being implemented by hardware, like another implementation, the plurality of steps or methods may be implemented by any one of following technologies in the art or a combination thereof: a discrete logic circuit of a logic gate circuit for realizing a logic function for a data signal, an application-specific integrated circuit having a suitable combined logic gate circuit, a programmable gate array (PGA), and a field programmable gate array (FPGA).

A person of ordinary skill in the art may understand that all or some of the processes of the methods in the embodiments may be implemented by a computer program instructing relevant hardware. The program may be stored in a computer readable storage medium. When the program is executed, one or a combination of the procedures of the methods in the embodiments are performed.

In addition, functional units in the embodiments of this application may be integrated into one processing unit, or each of the units may exist alone physically, or two or more units may be integrated into one unit. The integrated module may be implemented in a form of hardware, or may be implemented in a form of a software functional module. When the integrated module is implemented in the form of a software functional module and sold or used as an independent product, the integrated module may be stored in a computer-readable storage medium.

The storage medium mentioned above may be a read-only memory, a magnetic disc, or an optical disc. Although the embodiments of this application have been shown and described as above, it may be understood that the embodiments are examples and cannot be understood as a limit to this application. A person of ordinary skill in the art can make changes, modifications, replacements, and deformations on the embodiments in a scope of this application.

What is claimed is:

1. A costume replacement method, the costume replacement method being performed by at least one processor, and the costume replacement method comprising:

based on a user input, obtaining information of a model comprising a plurality of parts, the plurality of parts comprising a target part of which a costume is to be replaced;

obtaining image set object data corresponding to the model of which the information is obtained, the image set object data comprising a plurality of pieces of image data respectively corresponding to the plurality of parts;

obtaining a memory address of one of the plurality of pieces of image data corresponding to the target part, using a quantity of bytes occupied by each pixel, and using a pixel point correlating to a vertex of an area where the plurality of pieces of image data corresponding to the target part are located;
obtaining costume replacement data corresponding to the target part comprised in the model of which the information is obtained;
updating the obtained image set object data by copying the obtained costume replacement data to the obtained memory address to overwrite the one of the plurality of pieces of image data; and
rendering the model, based on the updated image set object data, to update the costume of the target part comprised in the model.

2. The costume replacement method according to claim 1, further comprising, before the copying the obtained costume replacement data corresponding to the target part:
obtaining a region parameter of the one of the plurality of pieces of image data corresponding to the target part, in the obtained image set object data; and
adjusting the obtained costume replacement data, based on the obtained region parameter.

3. The costume replacement method according to claim 2, wherein the adjusting the obtained costume replacement data corresponding to the target part comprises performing an angle rotation and/or a resizing of the obtained costume replacement data, based on the obtained region parameter of the one of the plurality of pieces of image data corresponding to the target part.

4. The costume replacement method according to claim 2, wherein the region parameter of the one of the plurality of pieces of image data corresponding to the target part comprises any one or any combination of a pixel coordinate, a pixel offset, a rotation amount, a length, and a width.

5. A non-transitory computer-readable storage medium storing instructions that cause the at least one processor to perform the costume replacement method of claim 1.

6. A costume replacement method, the costume replacement method being performed by at least one processor, and the costume replacement method comprising:
based on a user input, obtaining information of a model comprising a plurality of parts, the plurality of parts comprising a target part of which a costume is to be replaced;
obtaining image set object data corresponding to the model of which the information is obtained, the image set object data comprising a plurality of pieces of image data respectively corresponding to the plurality of parts,
obtaining a memory address of one of the plurality of pieces of image data corresponding to the target part using a quantity of bytes occupied by each pixel, and using a pixel point correlating to a vertex of an area where the plurality of pieces of image data corresponding to the target part are located;
obtaining costume replacement data corresponding to the target part comprised in the model of which the information is obtained;
creating new image set object data corresponding to the model, by copying the obtained costume replacement data to the obtained memory address of the one of the plurality of pieces of image data to overwrite the one of the plurality of pieces of image data; and
rendering the model, based on the created new image set object data, to update the costume of the target part comprised in the model.

7. The costume replacement method according to claim 6, further comprising, before the creating the new image set object data:
obtaining a region parameter of one of the plurality of pieces of image data corresponding to the target part, in the obtained image set object data; and
adjusting the obtained costume replacement data, based on the obtained region parameter,
wherein the creating the new image set object data comprises creating the new image set object data, based on the obtained image set object data and the adjusted costume replacement data.

8. The costume replacement method according to claim 7, wherein the adjusting the obtained costume replacement data corresponding to the target part comprises performing an angle rotation and/or a resizing of the obtained costume replacement data, based on the obtained region parameter of the one of the plurality of pieces of image data corresponding to the target part.

9. The costume replacement method according to claim 8, wherein the region parameter of the one of the plurality of pieces of image data corresponding to the target part comprises any one or any combination of a pixel coordinate, a pixel offset, a rotation amount, a length, and a width.

10. A non-transitory computer-readable storage medium storing instructions that cause the at least one processor to perform the costume replacement method of claim 6.

11. An electronic device comprising:
at least one memory configured to store computer program code; and
at least one processor configured to access the at least one memory and operate according to the computer program code, the computer program code comprising:
first obtaining code configured to cause the at least one processor to, based on a user input, obtain information of a model comprising a plurality of parts, the plurality of parts comprising a target part of which a costume is to be replaced;
second obtaining code configured to cause the at least one processor to obtain image set object data corresponding to the model of which the information is obtained, the image set object data comprising a plurality of pieces of image data respectively corresponding to the plurality of parts;
third obtaining code code configured to cause the at least one processor to obtain a memory address of one of the plurality of pieces of image data corresponding to the target part, using a quantity of bytes occupied by each pixel, and using a pixel point correlating to a vertex of an area where the plurality of pieces of image data corresponding to the target part are located;
fourth obtaining code configured to cause the at least one processor to obtain costume replacement data corresponding to the target part comprised in the model of which the information is obtained;
first updating code configured to cause the at least one processor to update the obtained image set object data by copying the obtained costume replacement data to the obtained memory address to overwrite the one of the plurality of pieces of image data; and
second updating code configured to cause the at least one processor to render the model, based on the updated image set object data, to update the costume of the target part comprised in the model.

12. The electronic device according to claim 11, further comprising:
fifth obtaining code configured to cause the at least one processor to, before the obtained costume replacement data corresponding to the target part is copied, obtain a region parameter of the one of the plurality of pieces of image data corresponding to the target part, in the obtained image set object data; and adjustment code configured to cause the at least one processor to, before the obtained costume replacement data corresponding to the target part is copied, adjust the obtained costume replacement data, based on the obtained region parameter.

13. The electronic device according to claim 12, wherein the adjustment code is further configured to cause the at least one processor to perform an angle rotation and/or a resizing of the obtained costume replacement data, based on the obtained region parameter of the one of the plurality of pieces of image data corresponding to the target part.

14. The electronic device according to claim 12, wherein the region parameter of the one of the plurality of pieces of image data corresponding to the target part comprises any one or any combination of a pixel coordinate, a pixel offset, a rotation amount, a length, and a width.

15. The electronic device according to claim 11, further comprising:

creation code configured to cause the at least one processor to create new image set object data corresponding to the model, based on the obtained image set object data and the obtained costume replacement data; and third updating code configured to cause the at least one processor to render the model, based on the created new image set object data, to update the costume of the target part comprised in the model.

16. The electronic device according to claim 15, further comprising:

fifth obtaining code configured to cause the at least one processor to, before the new image set object data is created, obtain a region parameter of the one of the plurality of pieces of image data corresponding to the target part, in the obtained image set object data; and adjustment code configured to cause the at least one processor to, before the new image set object data is created, adjust the obtained costume replacement data, based on the obtained region parameter, wherein the creation code is further configured to cause the at least one processor to create the new image set object data, based on the obtained image set object data and the adjusted costume replacement data.

17. The electronic device according to claim 16, wherein the adjustment code is further configured to cause the at least one processor to perform an angle rotation and/or a resizing of the obtained costume replacement data, based on the obtained region parameter of the one of the plurality of pieces of image data corresponding to the target part.

18. The electronic device according to claim 17, wherein the region parameter of the one of the plurality of pieces of image data corresponding to the target part comprises any one or any combination of a pixel coordinate, a pixel offset, a rotation amount, a length, and a width.

\* \* \* \* \*